US012795385B2

(12) United States Patent
Sharma et al.

(10) Patent No.: US 12,795,385 B2
(45) Date of Patent: Nov. 10, 2026

(54) SYSTEMS AND METHODS FOR GEOLOCATION-BASED KEY PERFORMANCE INDICATOR VISUALIZATION IN A TELECOMMUNICATIONS NETWORK

(71) Applicant: Rakuten Symphony, Inc., Tokyo (JP)

(72) Inventors: Keshav Sharma, Indore (IN); Manohar Nagar, Indore (IN); Harshit Shroti, Indore (IN); Durgesh Rathore, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 462 days.

(21) Appl. No.: 18/035,966

(22) PCT Filed: Mar. 29, 2023

(86) PCT No.: PCT/US2023/016653
§ 371 (c)(1),
(2) Date: May 9, 2023

(87) PCT Pub. No.: WO2024/205578
PCT Pub. Date: Oct. 3, 2024

(65) Prior Publication Data
US 2024/0354681 A1 Oct. 24, 2024

(51) Int. Cl.
*H04W 16/18* (2009.01)

(52) U.S. Cl.
CPC .................................. *H04W 16/18* (2013.01)

(58) Field of Classification Search
CPC ..... H04W 24/08; H04W 64/00; H04W 16/18; H04W 4/029; H04W 24/04;
(Continued)

(56) References Cited

U.S. PATENT DOCUMENTS 6,971,063 B1 * 11/2005 Rappaport ............ H04W 24/00 715/733
7,190,377 B2 * 3/2007 Scott ....................... G06T 17/05 345/619
(Continued)

FOREIGN PATENT DOCUMENTS

CN 108458731 A * 8/2018 ............. G06T 19/20
CN 120786429 A * 10/2025 ........... H04L 43/045
(Continued)

OTHER PUBLICATIONS

Translation of CN-120786428-A (Year: 2026).*
(Continued)

*Primary Examiner* — Matthew C Sams
(74) *Attorney, Agent, or Firm* — Sughrue Mion, PLLC

(57) ABSTRACT

Systems and methods for implementing geolocation-based key performance indicator (KPI) visualization in a polygon-defined geolocation area of a telecommunications network, the system includes: a memory storing instructions; a processor configured to execute the instructions to: generate pixel coordinates of a polygon circumscribing the area from a pixel map; determine, for each generated pixel coordinate of the polygon, pixel tiles that insect with the extracted pixel coordinate of the polygon from the pixel map; determine, for each pixel tile among the pixel tiles that intersect with the extracted pixel coordinate of the polygon, pixels that intersect with the polygon, and for each pixel among the pixels that intersect with the polygon, determine a color of the pixel, and determine, based on the color, a KPI value from a lookup table; output, for each pixel among the one or more pixels that intersect with the polygon, the KPI value.

21 Claims, 11 Drawing Sheets

(58) Field of Classification Search

CPC ... H04W 52/225; H04W 24/02; H04W 4/021; H04W 4/80; H04W 64/003; H04W 4/02; H04W 84/18; H04W 16/32; H04W 24/00; H04W 24/10; H04W 84/005; H04W 88/18; H04W 40/244; H04W 48/12; H04W 88/02; H04W 88/08; H04W 4/023; H04W 4/33; H04W 16/28; H04W 72/046; H04W 84/12; H04W 16/20; H04W 28/0226; H04W 4/50; H04W 48/16; H04W 88/06; H04W 36/06; H04W 36/22; H04W 36/304; H04W 36/322; H04W 76/14; H04W 16/22; H04W 24/06; H04W 28/0284; H04W 4/025; H04W 4/027; H04W 4/38; H04W 52/242; H04W 72/23; H04W 72/51; H04W 72/54; H04W 8/005; H04W 84/042; H04W 88/16; H04W 16/00; H04M 3/2236

See application file for complete search history.

(56) References Cited

U.S. PATENT DOCUMENTS

| | | | | |
|---|---|---|---|---|
| 11,190,902 | B1 * | 11/2021 | Brosowsky | G06T 17/05 |
| 12,192,061 | B2 * | 1/2025 | Jain | H04L 41/12 |
| 12,520,177 | B2 * | 1/2026 | Sharma | H04W 24/04 |
| 2005/0270299 | A1 * | 12/2005 | Rasmussen | G06T 3/40 345/552 |
| 2006/0015814 | A1 * | 1/2006 | Rappaport | H04L 41/145 715/733 |
| 2007/0296824 | A1 * | 12/2007 | Paine | G06T 15/205 348/222.1 |
| 2014/0267262 | A1 * | 9/2014 | Masry | G06T 17/20 345/423 |
| 2014/0280318 | A1 * | 9/2014 | Simms | G06F 16/29 707/769 |
| 2017/0219681 | A1 * | 8/2017 | Ghinamo | H04W 64/00 |
| 2018/0063738 | A1 * | 3/2018 | Beluri | H04W 24/02 |
| 2018/0242178 | A1 * | 8/2018 | Barton | H04W 24/08 |
| 2020/0097491 | A1 * | 3/2020 | Berthiaume | G06N 20/00 |
| 2020/0267498 | A1 * | 8/2020 | Draper | H04W 4/029 |
| 2022/0159347 | A1 * | 5/2022 | Froehlich | H04N 21/64738 |
| 2023/0217357 | A1 * | 7/2023 | Rathore | H04W 24/08 370/329 |
| 2024/0171483 | A1 * | 5/2024 | Trivedi | H04L 43/16 |

FOREIGN PATENT DOCUMENTS

| | | | | |
|---|---|---|---|---|
| WO | WO-2020172320 A1 | * | 8/2020 | H04L 67/51 |
| WO | WO-2023211430 A1 | * | 11/2023 | G06Q 10/0631 |
| WO | WO-2025008843 A1 | * | 1/2025 | H04W 16/18 |

OTHER PUBLICATIONS

Written Opinion of the International Searching Authority dated Jul. 10, 2023 in Application No. PCT/US23/16653.

International Search Report dated Jul. 10, 2023 in Application No. PCT/US23/16653.

* cited by examiner

KPI RANGE RESOLUTION BASED ON COLOR RANGE

| RGB | KP1 1 KPI VALUES | KP1 2 KPI VALUES |
|---|---|---|
| 255_255_255 | -113 | 98 |
| 5_3_9 | -114 | 90 |
| | | |
| | | |
| | | |
| | | |
| R_G_B | KP1 VALUE (R_G_B) | KP2 VALUE (R_G_B) |

FIG. 7

SYSTEMS AND METHODS FOR GEOLOCATION-BASED KEY PERFORMANCE INDICATOR VISUALIZATION IN A TELECOMMUNICATIONS NETWORK

TECHNICAL FIELD

Systems and methods consistent with example embodiments of the present disclosure relate to geolocation-based key performance indicator visualization in a telecommunications network.

BACKGROUND

In the related art, visualization tools for network element (i.e., cell site) analysis comprise functionality that can only identify the network element coverage (i.e., a key performance indicator (KPI) of a radio access network (RAN)) at a particular geolocation (i.e., RAN KPIs at the particular geolocation having a coordinate with latitude and longitude).

As a result, in case of an analysis of a network element (i.e., cell site) coverage of a geographical area, according to the related art, human interaction of users (e.g., network engineers) is needed to manually gather the coverage information (i.e., the respective RAN KPIs) by looking up the respective RAN KPIs at multiple geolocations (i.e. the respective RAN KPIs of multiple coordinates on a geolocation map) covering the geographical area of interest. Moreover, human interaction of users (e.g., network engineers) is needed to manually populate (input) the respective RAN KPIs of multiple coordinates on a geolocation map into the datasheets to get the geographical area-wise coverage information. Due to the human interaction during populating the datasheets to get the geographical area-wise coverage information the inputted RAN KPIs may be not accurate due to the inaccuracy of the manually collected RAN KPIs.

Moreover, this manual process is tedious and time-consuming because users (network engineers) need to identify coverage for a given geographical area for multiple RAN KPIs (e.g., Reference Signals Received Power (RSRP), Signal to Interference plus Noise Ratio (SINR), etc.) and the manual acquisition needs to go through the same tedious manual process for each of the RAN KPIS.

As a result, due to the manual process according to the related art, the analysis of a network element (i.e., cell site) coverage of a given geographical area as well as the geolocation-based key performance indicator visualization of the given geographical area may be limited by feasibility or takes very long and may be unreliable.

SUMMARY

According to embodiments, systems and methods are provided for implementing geolocation-based key performance indicator visualization to automatically determine and output geolocation-based key performance indicators (KPIs) of a telecommunications network located in a specific (e.g., freely determined or given) polygon-defined geolocation area. In particular, the systems and methods provide for extracting colors of pixels from pixel tiles intersecting with the specific geolocation areas of polygonal shape (i.e., the polygon boundary) in order to allow for an automated output of KPI values within the boundary of a specific geolocation area (polygon) (e.g., a geolocation-based key performance indicator visualization of the specific geolocation area).

As a result, the systems and methods have the advantage that the tedious and time-consuming human interaction to manually process collecting and populating geolocation-based key performance indicators at a plurality of geolocation (based on a plurality of coordinates with latitudes and longitudes on a geolocation map) can be automated to increase the efficiency of RAN management and the advantage that human error in determining the geolocation-based key performance indicators in specific geolocation area a can be eliminated.

According to embodiments, a system for implementing geolocation-based key performance indicator (KPI) visualization in a polygon-defined geolocation area of a telecommunications network, the system includes: a memory storing instructions; and at least one processor configured to execute the instructions to: based on the polygon-defined geolocation area, receive data defining the boundaries of the polygon-defined geolocation area; based on the received data, generate pixel coordinates of a polygon circumscribing the boundaries of the polygon-defined geolocation area from a pixel map; determine, for each generated pixel coordinate of the polygon, one or more pixel tiles that insect with the generated pixel coordinate of the polygon from the pixel map, wherein a pixel tile represents an array of pixels from the pixel map; determine, for each pixel tile among the pixel tiles that intersect with the generated pixel coordinate of the polygon, one or more pixels that intersect with the polygon, and for each pixel among the one or more pixels that intersect with the polygon, determine a color of the pixel, and determine, based on the color, a KPI value for at least one KPI from a lookup table; output, for each pixel among the one or more pixels that intersect with the polygon, the at least one KPI value for each of the at least one KPI.

According to embodiments, a method for implementing geolocation-based key performance indicator (KPI) visualization in a polygon-defined geolocation area of a telecommunications network, the method includes: based on the polygon-defined geolocation area, receiving data defining the boundaries of the polygon-defined geolocation area; based on the received data, generating pixel coordinates of a polygon circumscribing the boundaries of the polygon-defined geolocation area from a pixel map; determining, for each generated pixel coordinate of the polygon, one or more pixel tiles that insect with the generated pixel coordinate of the polygon from the pixel map, wherein a pixel tile represents an array of pixels from the pixel map; determining, for each pixel tile among the pixel tiles that intersect with the generated pixel coordinate of the polygon, one or more pixels that intersect with the polygon, and for each pixel among the one or more pixels that intersect with the polygon, determining a color of the pixel, and determining, based on the color, a KPI value for at least one KPI from a lookup table; outputting, for each pixel among the one or more pixels that intersect with the polygon, the at least one KPI value for each of the at least one KPI.

According to embodiments, a non-transitory computer-readable recording medium having recorded thereon instructions executable by at least one processor configured to perform a method for implementing geolocation-based key performance (KPI) indicator visualization in a polygon-defined geolocation area of a telecommunications network, the method includes: based on the polygon-defined geolocation area, receiving data defining the boundaries of the polygon-defined geolocation area; based on the received data, generating pixel coordinates of a polygon circumscribing the boundaries of the polygon-defined geolocation area from a pixel map; determining, for each generated pixel coordinate of the polygon, one or more pixel tiles that insect with the generated pixel coordinate of the polygon from the pixel map, wherein a pixel tile represents an array of pixels from the pixel map; determining, for each pixel tile among the pixel tiles that intersect with the generated pixel coordinate of the polygon, one or more pixels that intersect with the polygon, and for each pixel among the one or more pixels that intersect with the polygon, determining a color of the pixel, and determining, based on the color, a KPI value for at least one KPI from a lookup table; outputting, for each pixel among the one or more pixels that intersect with the polygon, the at least one KPI value for each of the at least one KPI.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 7 illustrates a method for determining KPI values for at least one KPI from a lookup table based on a color code for each pixel among the one or more pixels that intersect with the polygon according to an embodiment;

DETAILED DESCRIPTION

Figure 1:
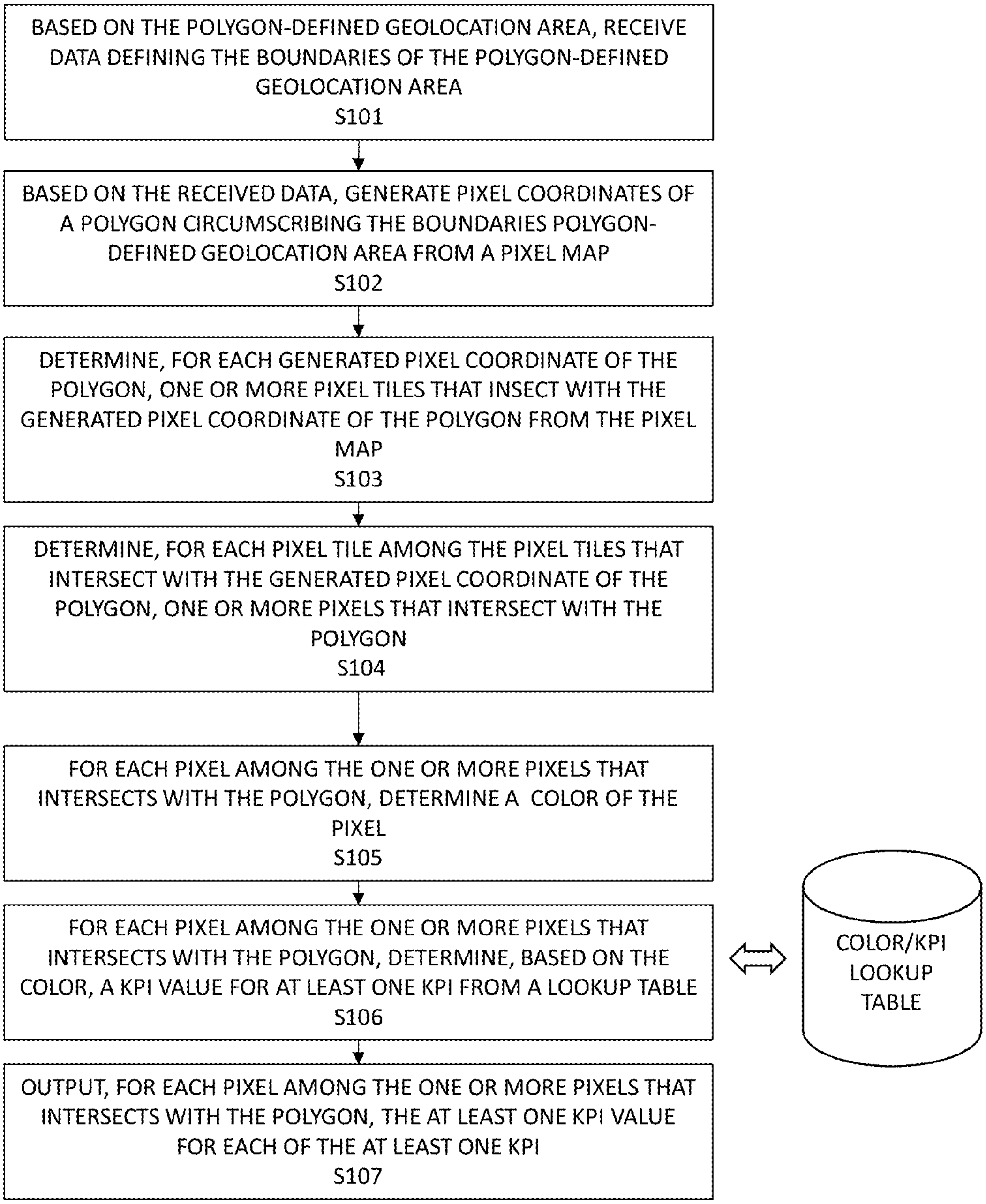
FIG. 1 illustrates a method for implementing geolocation-based key performance indicator visualization in a polygon-defined geolocation area according to an embodiment.

The following detailed description of exemplary embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which network elements intersecting with specific geolocation areas of polygonal shape are determined without human interaction in order to allow for an automated listing of network elements in said specific geolocation areas (i.e., within the boundaries of the specific geolocation areas (polygons)) in an efficient and reliable manner without human error.

FIG. 1 illustrates a method for implementing geolocation-based key performance indicator visualization in a polygon-defined geolocation area according to an embodiment.

Referring to FIG. 1, in step S101 based on the polygon-defined geolocation area, the system receives data defining the boundaries of the polygon-defined geolocation area. For example, a geolocation area defined by a polygonal shape may refer to any area that is defined by coordinates (e.g., longitude and latitude data) spanning a plane with a polygonal shape on a map.

In an example embodiment, the data defining the boundaries of the polygonal-defined geolocation area may be spatial data of a freely determined (drawn) geolocation area defined by a polygonal shape created by user input via a graphical user interface (GUI) of a visualization software service displaying a map.

In another embodiment, the geolocation area defined by the polygon shape may be determined by geolocation data (e.g., geolocation data such as longitude and latitude data) defining the boundaries of the geolocation area defined by a polygon. The geolocation data may be, for example, data stored in a spatial data file such as a Keyhole Markup Language (KML) data file, wherein Keyhole Markup Language format is used to display geographic data (i.e., geolocation graphical user interface such as a geolocation browser).

Moreover, the geolocation data may be stored in a spatial data file such as, for example, a TAB file format (i.e., a geospatial vector data format developed for geographic information system (GIS) software), a SHAPE file (*.shp) format (i.e., another geospatial vector data format for geographic information system (GIS) software), etc.

In yet another example embodiment, the data defining the boundaries of the polygonal-defined geolocation area may refer to polygon identification data defining the boundaries of the polygon-defined geolocation area of a stored polygon in a geographic service database. In this case, the user may select a polygon by inputting (selecting) data identifying the polygon (i.e., polygon identification data), such as the name of a geographic area to which the polygon relates. For example, the country-specific names of prefectures (states), cities, counties, districts, etc. included in a country to define the geographical areas to which the polygon refers (i.e., the polygon data stored in the geographic service database).

In step S102, based on the received data, the system generates pixel coordinates of a polygon circumscribing the boundaries of the polygon-defined geolocation area from a pixel map. For example, based on the received data defining the boundaries of the polygon-defined geolocation area, the system generates coordinates (e.g., longitude and latitude data) of at least one polygon-defined geolocation area and assigns the coordinates (e.g., longitude and latitude data) to the respective pixels (i.e., pixel coordinates) in the pixel map. For example, a pixel coordinate (i.e., a pixel) in the pixel map may refer to an area of 1, 2, 4, 6, etc. square meters to which the geo-location coordinate (e.g., longitude and latitude data) is assigned.

In an example embodiment, the system may generate pixel coordinates from data defining the boundaries of the polygon-defined geolocation area received from a GUI.

In another example embodiment, the system may generate the pixel coordinates from a data file comprising geolocation data, for example, in geospatial vector data formats for geographic information system (GIS) software (e.g., TAB or SHAP files), in a KML format, etc.

In yet another example embodiment, the system may generate the pixel coordinates based on the user selection of a polygon, wherein the system may retrieve (generate) the coordinates from a geographic service database.

In step S103, the system determines, for each generated pixel coordinate of the polygon, one or more pixel tiles that insect with the polygon generated pixel coordinate from the pixel map, wherein a pixel tile represents an array of pixels from the pixel map. For example, a pixel tile may be a square array of pixels (e.g., a 256 by 256 array of pixels).

In an example embodiment, the pixel tiles of the pixel map may have an index identifier. In this case, the system may determine, for each generated pixel coordinate of the polygon boundary, the index identifier of each pixel tile that insect with the generated pixel coordinate of the polygon boundary from an index list. According to this example embodiment, the system may generate a list of index identifiers of intersecting pixel tiles by extrapolating pixel tiles that insect within the boundary polygon from the pixel map, wherein the generated list of index identifiers represents all pixel tiles that intersect with the polygon.

In step S104, the system determines, for each pixel tile among the pixel tiles that intersect with the generated pixel coordinate of the polygon, one or more pixels that intersect with the polygon.

In an example embodiment, the system may determine, based on an iteration of the pixels tiles as listed in the list of index identifiers, one or more pixels that intersect with the polygon.

For example, the one or more pixels that intersect with a specific polygon may be stored in a memory of the system which allows for fast processing of the method for implementing geolocation-based key performance indicator visualization in a polygon-defined geolocation area.

In step S105, the system determines, for each pixel among the one or more pixels that intersect with the polygon, the color of the pixel. For example, the system extracts RGB colors from pixel information of the pixels. In general, RGB color values are supported in graphical user interfaces and an RGB color value may be specified as RGB (red, green, blue), wherein each of the three parameters (red, green, and blue) defines the intensity of the color with a value between 0 and 255. For example, RGB (255, 0, 0) is displayed as red, because red is set to its highest value (255), and the other two (green and blue) are set to 0. In another example, RGB (0, 255, 0) is displayed as green, because green is set to its highest value (255), and the other two (red and blue) are set to 0.

In step S106, based on the (determined) color, the system determines a KPI value for at least one KPI from a lookup table.

For example, the lookup table may comprise a column that includes a range of predetermined RGB color values. The range of predetermined RGB color values defines the number of rows of the lookup table. The range of predetermined RGB color values refers to a number of RGB color values, wherein the number of RGB color values refer to the number of rows of the lookup table (e.g., 64 rows, 128 rows, 256 rows, etc. in the lookup table).

The range of predetermined RGB color values is based on the settings of a system operator. In accordance with the settings, the range of predetermined RGB color values determines the resolution of the KPI values between a maximum KPI value and a minimum KPI value. For example, for a range of 128 RGB color values, a resolution of 126 KPI values between the maximum KPI value and the minimum KPI value can be visualized by the range.

Moreover, the lookup table may include a plurality of columns referring to a plurality of KPIs. The plurality of KPIs may be listed in accordance with the resolution of the KPI values as set forth above. Among the plurality of KPIs, the KPI may be at least one of a Reference Signal Received Quality (RSRQ), Reference Signals Received Power (RSRP), Signal to Interference plus Noise Ratio (SINR), Uplink (UL) data throughput, Downlink (DL) data throughput, etc.

As a result, each RGB color value is assigned a KPI value of at least one KPI which allows for the unique identification of the assigned the KPI value.

In step S107, for each pixel among the one or more pixels that intersect with the polygon, the system outputs at least one KPI value for each of the at least one KPI. For example, the system outputs a KPI value for each of the at least one KPI to display it in a graphical user interface. The polygon-defined geolocation area may be one of a specific (freely determined, user-defined, etc.,) geolocation area, a viewport area, a geolocation area defined country-specific names of prefectures (states), cities, counties, districts, etc. stored in a geographical area.

As a result, the system and method for implementing geolocation-based key performance indicator visualization in a polygon-defined geolocation area have the advantage that the tedious and time-consuming human interaction to manually process collecting and populating geolocation-based key performance indicators at a plurality of geolocation (based on a plurality of coordinates with latitudes and longitudes on a geolocation map) can be automated to increase the efficiency of RAN management and the advantage that human errors in determining the geolocation-based key performance indicators in specific geolocation area a can be eliminated.

Figure 2:
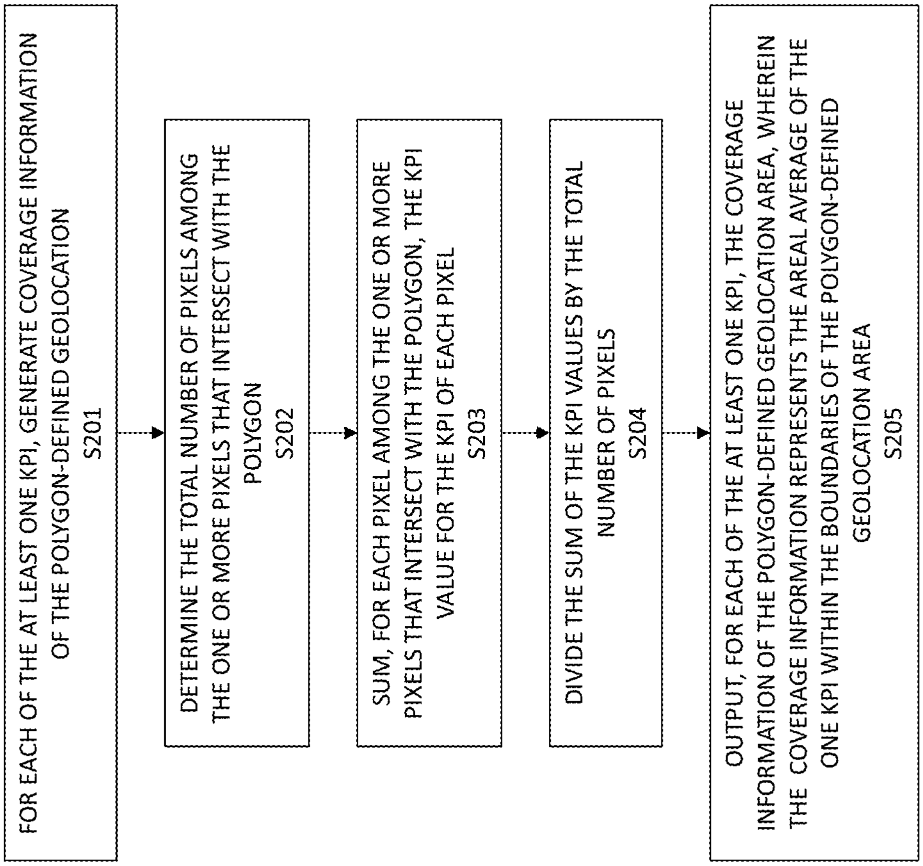
FIG. 2 illustrates a method for outputting coverage information of the polygon-defined geolocation area according to an embodiment.

FIG. 2 illustrates a method for outputting coverage information of the polygon-defined geolocation area according to an embodiment.

Referring to FIG. 2, in step S201, for each (of the at least one) KPI, the system generates coverage information of the polygon-defined geolocation area, wherein generating includes the following steps S202 to S205.

- In step S202, for each (of the at least one) KPI, the system determines the total number of pixels among the one or more pixels that intersect with the polygon.
- In step S203, for each (of the at least one) KPI, the system sums up, for each pixel among the one or more pixels that intersect with the polygon, the KPI value for the KPI of each pixel.
- In step S204, for each (of the at least one) KPI, the system divides the sum of the KPI values of all pixels among the one or more pixels that intersect with the polygon by the total number of pixels.
- In step S205, for each (of the at least one) KPI, the system outputs, the coverage information of the polygon-defined geolocation area, wherein the coverage information represents the areal average of the one KPI within the boundaries of the polygon-defined geolocation area.

As a result, the coverage information that represents the areal average of the one KPI within the boundaries of the polygon-defined geolocation area has the advantage that the coverage in the area can be easily analyzed and that it provides a simple and effective geolocation-based key performance indicator visualization of the polygon-defined geolocation area.

Figure 3A:
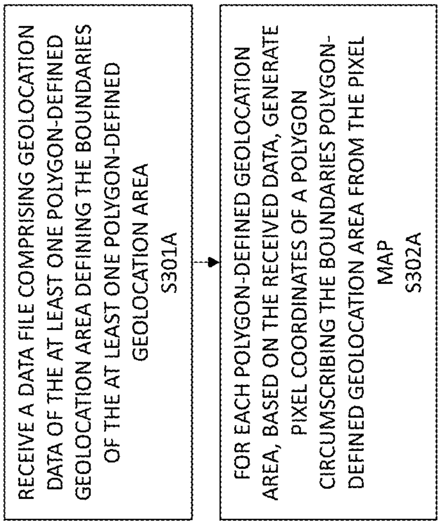
FIG. 3A illustrates a method for receiving data defining the boundaries of the polygon-defined geolocation area according to an embodiment.

FIG. 3A illustrates a method for receiving data defining the boundaries of the polygon-defined geolocation area according to an embodiment. Referring to FIG. 3A, in step S301A, the system receives a data file comprising geolocation data of at least one polygon-defined geolocation area defining the boundaries of the at least one polygon-defined geolocation area.

In an example embodiment, the data file may be a spatial data file such as a Keyhole Markup Language (KML) data file, wherein the Keyhole Markup Language format is used to display geographic data (i.e., geolocation graphical user interface such as a geolocation browser).

In another example embodiment, the data file may be a spatial data file such as, for example, a TAB file format (i.e., a geospatial vector data format developed for geographic information system (GIS) software), a SHAPE file (*.shp) format (i.e., another geospatial vector data format for geographic information system (GIS) software), etc.

In an example embodiment, in case the system determines that the data file comprising geolocation data of at least one polygon-defined geolocation area is not a Keyhole Markup Language (KML) data file, the system may convert the geolocation data of at least one polygon-defined geolocation area to a KML data file. Alternatively, the system may convert a data file in a TAB file format or a SHAP file format to a data file in the KML data file format.

In step S302A, for each polygon-defined geolocation area, based on the received data, the system generates pixel coordinates of a polygon circumscribing the boundaries of the polygon-defined geolocation area from the pixel map.

Thereafter, the system commences the method according to steps S103 to S107 as set forth in FIG. 1.

Figure 3B:
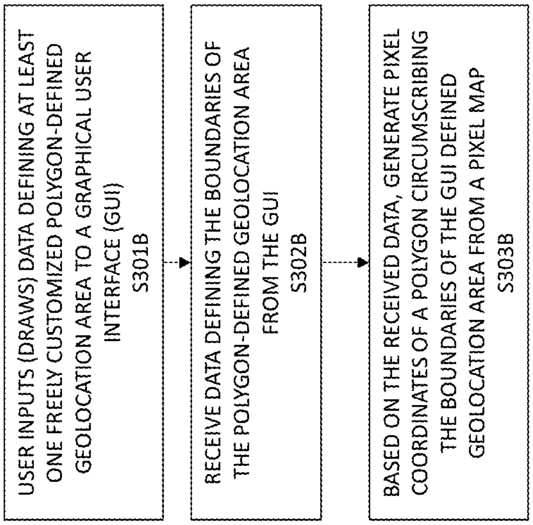
FIG. 3B illustrates a method for receiving data defining the boundaries of the polygon-defined geolocation area according to another embodiment.

FIG. 3B illustrates a method for receiving data defining the boundaries of the polygon-defined geolocation area according to another embodiment. Referring to FIG. 3B, in step S301B, the user enters pins (i.e., geolocations with latitudes and longitudes) defining the boundaries of at least one freely defined geolocation area to a graphical user interface (e.g., the user selects at least three geolocations (pins) defining coordinates such as latitude and longitude data on a map displayed by the graphical user interface (GUI)).

In an example embodiment, the user may select at least three pins defining coordinates (i.e., latitude and longitude data) on a map displayed by the graphical user interface and store the polygon defined by the at least three points selected by the user.

In order to identify the polygon, the user may input data identifying the polygon (i.e., polygon identification data) to a graphical user interface. For example, the polygon identification data may comprise at least one of a name of a geographic area to which the polygon relates, a category of the polygon, a source of the polygon, a creation date, an author of the polygon, etc.

In step S302B, the system receives the data defining the boundaries of the polygon-defined geolocation area from a graphical user interface (GUI) (i.e., according to freely defined geolocation area as input to the user input to the GUI.

In step S303B, based on the received data, the system generates pixel coordinates of a polygon circumscribing the boundaries of the GUI-defined geolocation area from a pixel map.

Thereafter, the system commences the method according to steps S103 to S107 as set forth in FIG. 1.

Figure 3C:
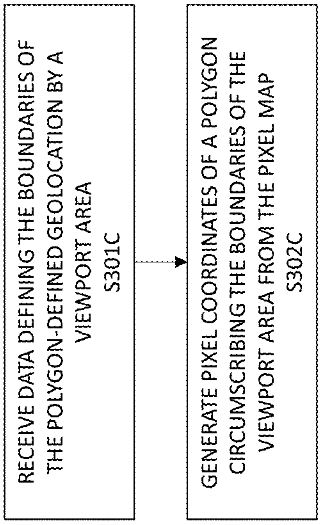
FIG. 3C illustrates a method for receiving data defining the boundaries of the polygon-defined geolocation area according to yet another embodiment.

FIG. 3C illustrates a method for receiving data defining the boundaries of the polygon-defined geolocation area according to yet another embodiment.

Referring to FIG. 3C, in step S301C, the system receives data defining the boundaries of the polygon-defined geolocation by a viewport area. For example, the viewport is defined as the user's visible area of a graphical user interface (e.g., a web page, window, etc.). The viewport may vary with the device specification and may be smaller on a mobile phone (smartphone) than on a computer screen.

In step S302C, the system generates pixel coordinates of a polygon circumscribing the boundaries of the viewport area from the pixel map.

Thereafter, the system commences the method according to steps S103 to S107 as set forth in FIG. 1.

Figure 4:
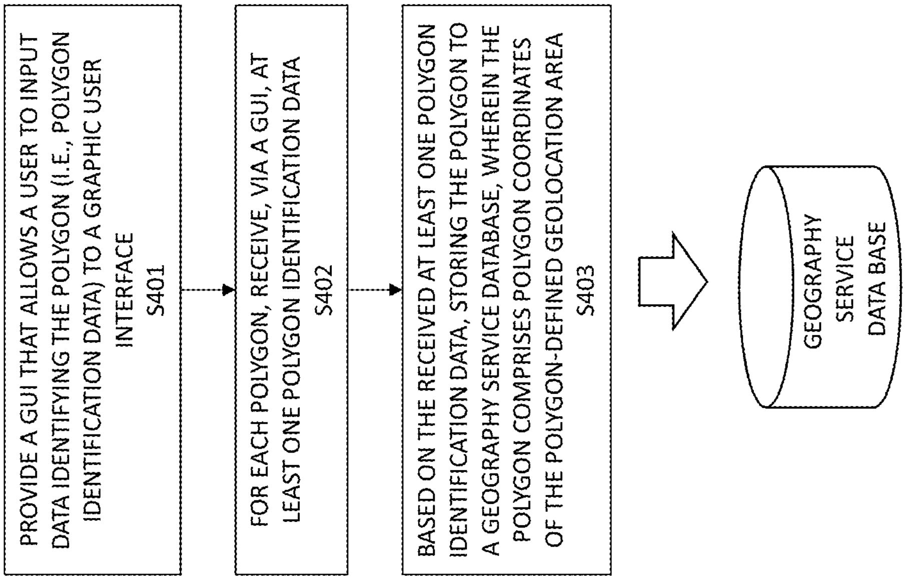
FIG. 4 illustrates a method for storing polygon data in a geography service database according to an embodiment.

FIG. 4 illustrates storing polygon data in a geography service database according to an embodiment. Referring to FIG. 4, when outputting at least one KPI value for each (of the at least one) KPI, in step S401, the system receives (based on the outputted KPI values) for each polygon, via a graphical user interface, at least one polygon identification data.

For example, in step S401, the system may provide a graphical user interface that allows a user to input data identifying the polygon (i.e., polygon identification data) to a graphical user interface. For example, the polygon identification data may comprise at least one of a name of a geographic area to which the polygon relates, a category of the polygon, a source of the polygon, a creation date, an author of the polygon, etc.

In step S402, the system, based on the received at least one polygon identification data, stores polygon data to a geography service database, wherein the polygon data comprises polygon coordinates of the polygon-defined geolocation area.

In an example embodiment, the polygon data may include at least one of the colors of the pixels that intersect with the polygon, the list index identifiers referring to all pixel tiles that intersect with the polygon, the pixel coordinates of the pixels that intersect with the polygon, the data defining the boundaries of the polygon-defined geolocation area, the at least one pixel-wise KPI value for each of the at least one KPI within the polygon, etc.

Referring to FIG. 4, user-defined geolocation areas may be added to the predetermined (fixed) geolocation areas that have not been stored in the geographic services database for later use.

For example, the user may select the geolocation data of the user-defined geolocation areas at one time and determine the network elements that intersect with the stored user-defined geolocation areas at a later time. This has the advantage of allowing the user to create a library of user-defined geolocation areas to perform geolocation-based polygon analysis to determine network elements within the user-defined polygon-defined geolocation areas stored in the geography services database.

Figure 5:
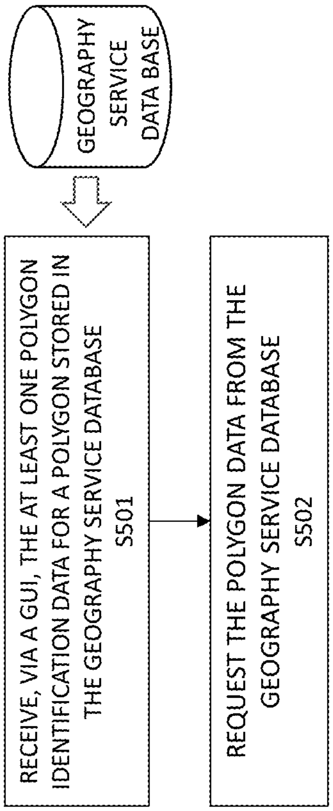
FIG. 5 illustrates a method for outputting at least one KPI value for each of the at least one KPI according to another embodiment.

FIG. 5 illustrates a method for receiving data defining the boundaries of the polygon-defined geolocation from a geography service database according to another embodiment. Referring to FIG. 5, in step S501, the system receives, via a graphical user interface, at least one polygon identification data for a polygon stored in the geography service database. For example, the user may select a stored polygon of FIG. 4.

In step S502, the system requests the polygon data from the geography service database. For example, the system among other polygon data as set forth in FIG. 4 may request the pixel coordinates of the polygon-defined geolocation area. The polygon identification data may include the data as set forth in FIG. 4. Thereafter, the system may commence the method according to at least one of steps S103 to S107 as set forth in FIG. 1.

Figure 6:
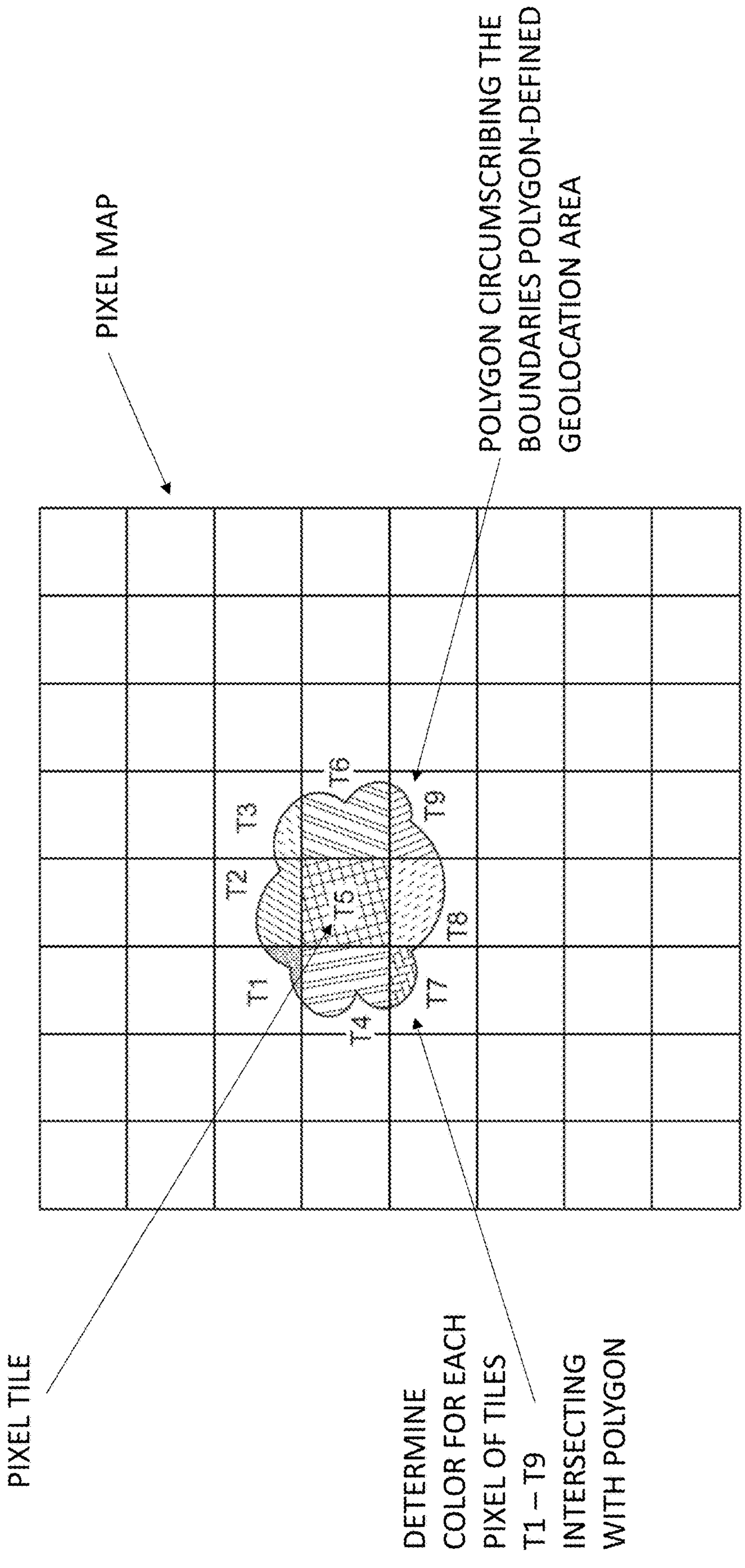
FIG. 6 illustrates a method for determining one or more pixel tiles that insect with the generated pixel coordinate of the polygon boundary and the one or more pixels thereof that intersect with the polygon from the pixel map according to an embodiment.

FIG. 6 illustrates a method for determining of one or more pixel tiles that insect with the generated pixel coordinate of the polygon boundary and the one or more pixels thereof that intersect with the polygon from the pixel map according to an embodiment.

Referring to FIG. 6, a pixel map represents a geographic map of geolocations having coordinates comprising a latitude and a longitude. According to the pixel map, the coordinates (e.g., longitude and latitude data) are assigned to respective pixels (i.e., pixel coordinates) in the pixel map. For example, a pixel coordinate (i.e., a pixel) in the pixel map may refer to an area of 1, 2, 4, 6, etc. square meters to which the geo-location coordinate (e.g., longitude and latitude data) is assigned.

Moreover, the pixel map is divided into titles. Each tile comprises an array of pixels. For example, a pixel tile may be a square array of pixels (e.g., a 256 by 256 array of pixels).

Upon generating the pixel coordinates of the polygon circumscribing the boundaries of the polygon-defined geolocation area from the pixel map, the system determines, for each generated pixel coordinate of the polygon, one or more pixel tiles that insect with the generated pixel coordinate of the polygon from the pixel map.

According to the example embodiment in FIG. 6, the pixel tiles (T1 to T9) intersect with the generated pixel coordinate of the polygon. Upon determining the tiles, for each of the tiles T1 to T9, the system determines one or more pixel tiles that insect with the generated pixel coordinate of the polygon from the pixel map, wherein a pixel tile represents an array of pixels from the pixel map.

As a result, only the pixels of intersecting tiles are processed. This has the advantage of fast processing for determining the intersecting pixels.

FIG. 7 illustrates a method for determining KPI values for at least one KPI from a lookup table based on a color code for each pixel among the one or more pixels that intersect with the polygon according to an embodiment. Referring to FIG. 7, upon determining the color of the pixel (e.g., a RGB color) the system (based on the color) determines, a KPI value for at least one KPI from a lookup table.

For example, an RGB color may have the RGB value RGB (255, 255, 255). According to the lookup table, for the first KPI 1 the related color refers to a KPI value of −113 and for the second KPI 2 the related color refers to a KPI value of 98. In a further example, the RGB color may have the RGB value RGB (5, 3, 9). According to the lookup table, for the first KPI 1 the related color refers to a KPI value of −114 and for the second KPI 2 this color refers to a KPI value of 90. In general, an RGB value RGB (R, G, B) relates to at least one KPI with a KPI value that refers to the RGB value RGB (R, G, B).

According to the lookup table in FIG. 7, the range of predetermined RGB color values defines the number of rows of the lookup table. The range of predetermined RGB color values refers to a number of RGB color values, wherein the number of RGB color values refers to the number of rows of the lookup table (e.g., 64 rows, 128 rows, 256 rows, etc. in the lookup table).

The range of predetermined RGB color values is based on the settings of a system operator. In accordance with the settings, the range of predetermined RGB color values determines the resolution of the KPI values between a maximum KPI value and a minimum KPI value. For example, for a range of 128 RGB color values, a resolution of 126 KPI values between the maximum KPI value and the minimum KPI value can be visualized.

Figure 8:
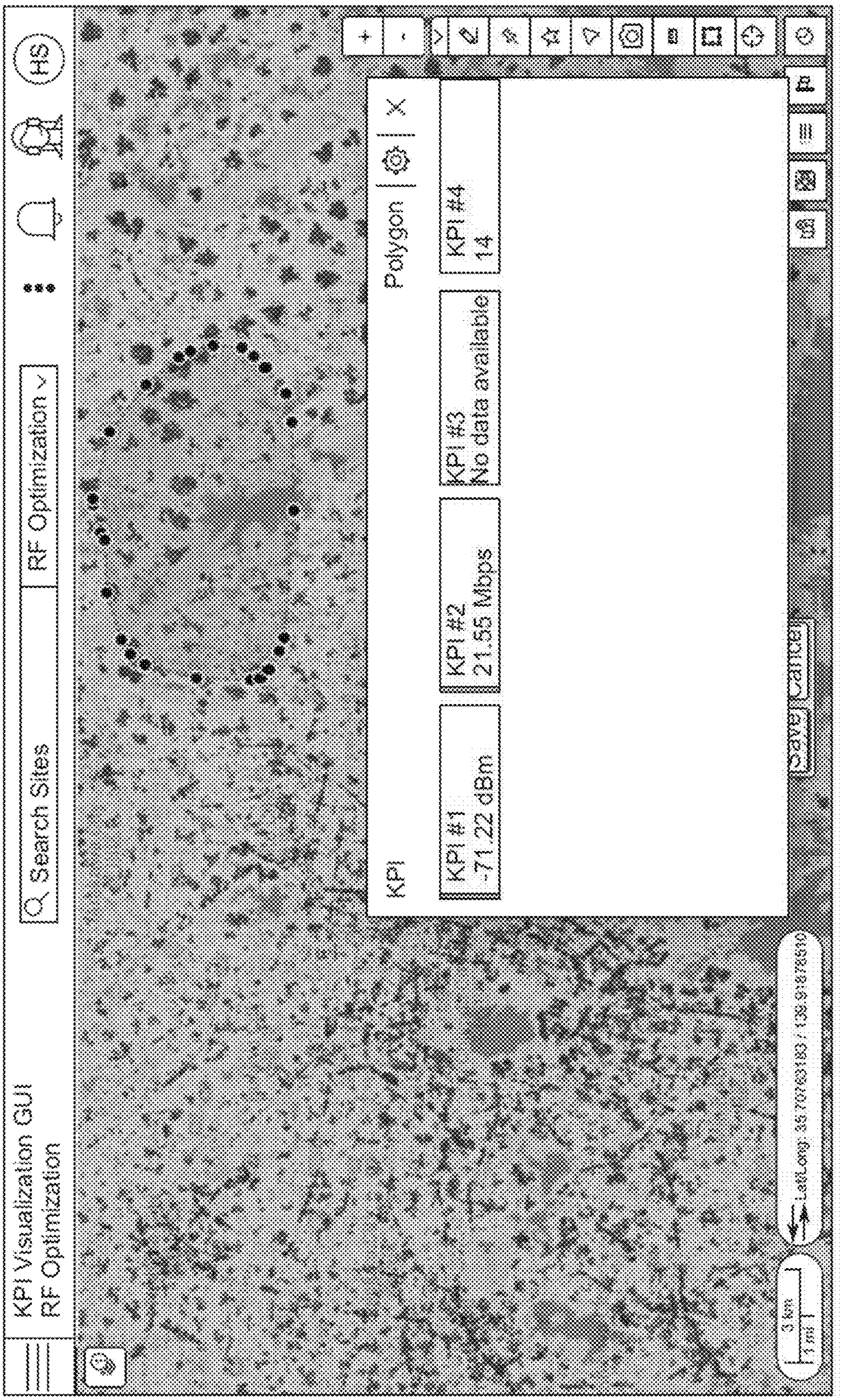
FIG. 8 illustrates a graphical user interface that visualizes coverage information of a user-defined polygon-defined geolocation area according to an embodiment.

FIG. 8 illustrates a graphical user interface that visualizes the coverage information of a user-defined polygon-defined geolocation area according to an embodiment. Referring to FIG. 8, the graphical user interface visualizes a specific (freely determined, user-defined, etc.,) geolocation area. The coverage information referring to the specific geolocation is determined according to the generation of the coverage information as set forth in FIG. 2. The coverage information is displayed on the KPI foreground window that shows, for example, a first KPI having a KPI value of −71.22 dbm, a second KPI having a KPI value of 21.55 Mbps, a third KPI that is not applicable, and a fourth KPI having a KPI value of 14.

Figure 9:
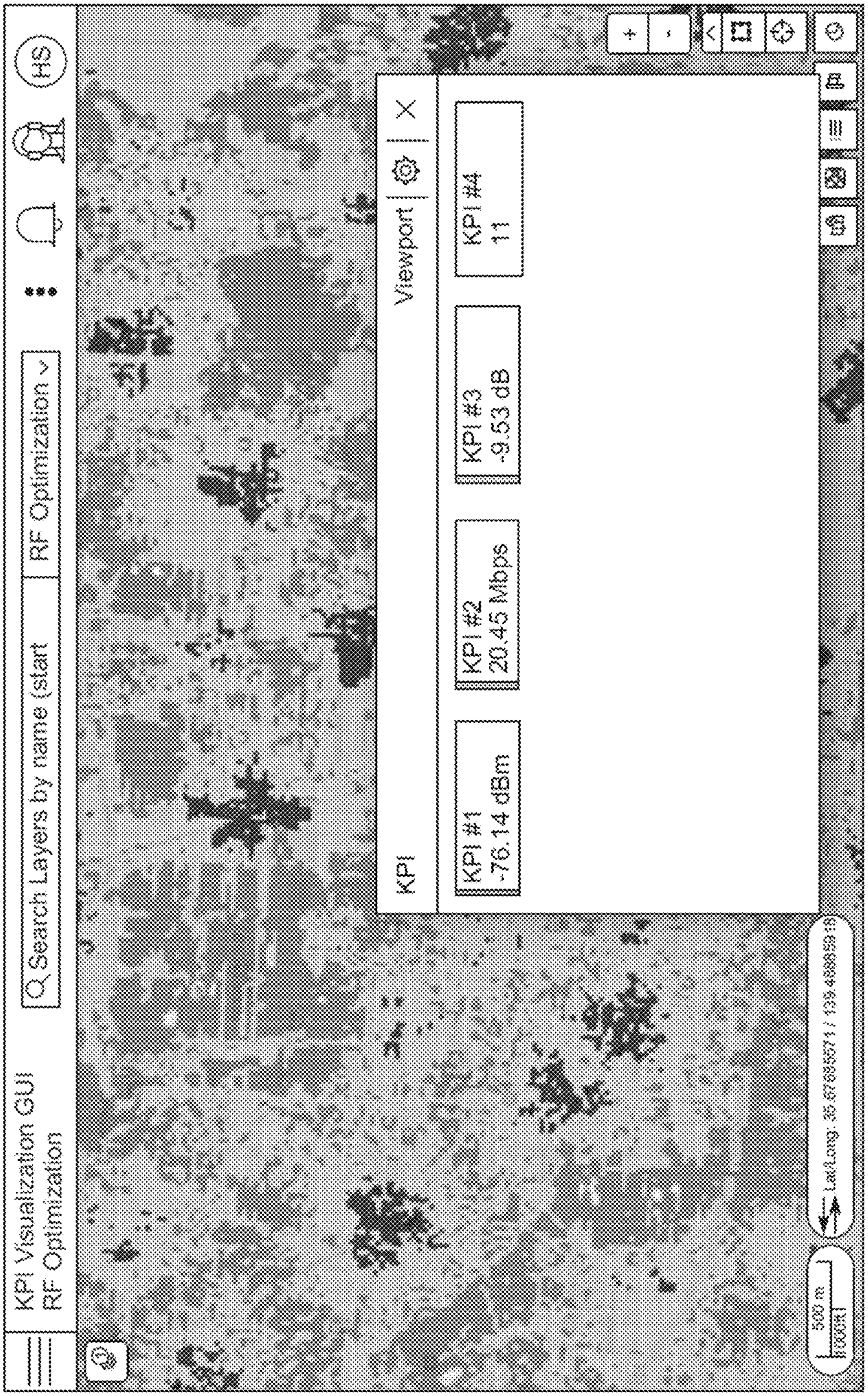
FIG. 9 illustrates a graphical user interface that visualizes one or more KPIs over a viewport area according to an embodiment.

FIG. 9 illustrates a graphical user interface that visualizes one or more KPIs over a viewport area according to an embodiment. Referring to FIG. 9, the graphical user interface visualizes a geolocation area that is defined by a viewport area. The coverage information referring to the viewport area is determined according to the generation of the coverage information as set forth in FIG. 2. The coverage information is displayed on the KPI foreground window that shows, for example, a first KPI having a KPI value of −76.14 dbm, a second KPI having a KPI value of −20.45 Mbps, a third KPI having a KPI value of −9.53 dbm and a fourth KPI having a KPI value of 11.

Figure 10:
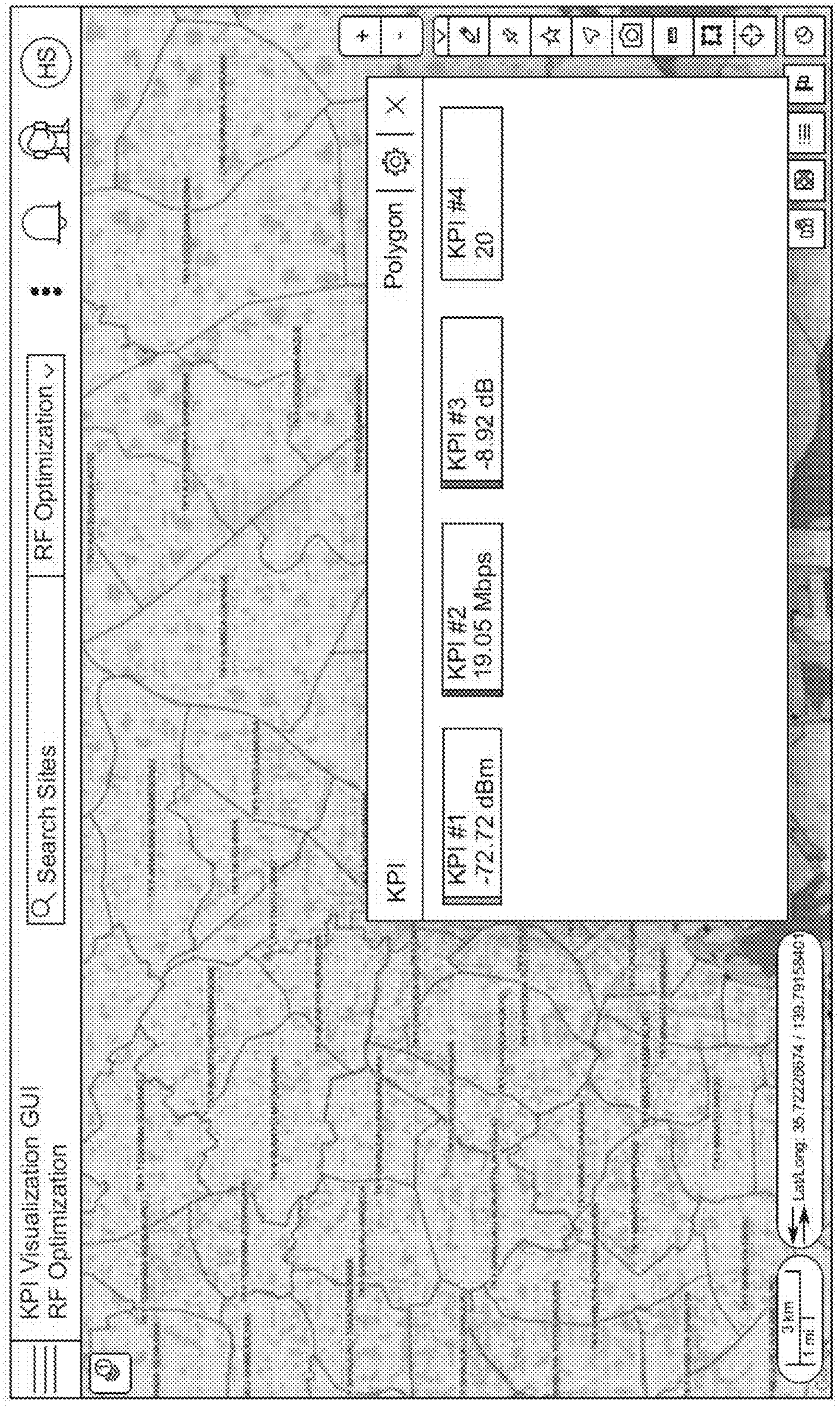
FIG. 10 illustrates a graphical user interface that visualizes one or more KPIs over a polygon stored in the geography service database according to an embodiment.

FIG. 10 illustrates a graphical user interface that visualizes one or more KPIs over a viewport area according to an embodiment. Referring to FIG. 10, the graphical user interface visualizes a specific geolocation area either defined by country-specific names (e.g., prefectures (states), cities, counties, districts, etc.) or defined by a stored polygon in the geography service database.

The coverage information referring to the specific geolocation area is determined according to the generation of the coverage information as set forth in FIG. 2. The coverage information is displayed on the KPI foreground window that shows, for example, a first KPI having a KPI value of −72.72 dbm, a second KPI having a KPI value have 19.05 Mbps, a third KPI having a KPI value of −8.92 dbm and a fourth KPI having a KPI value of 20.

Figure 11:
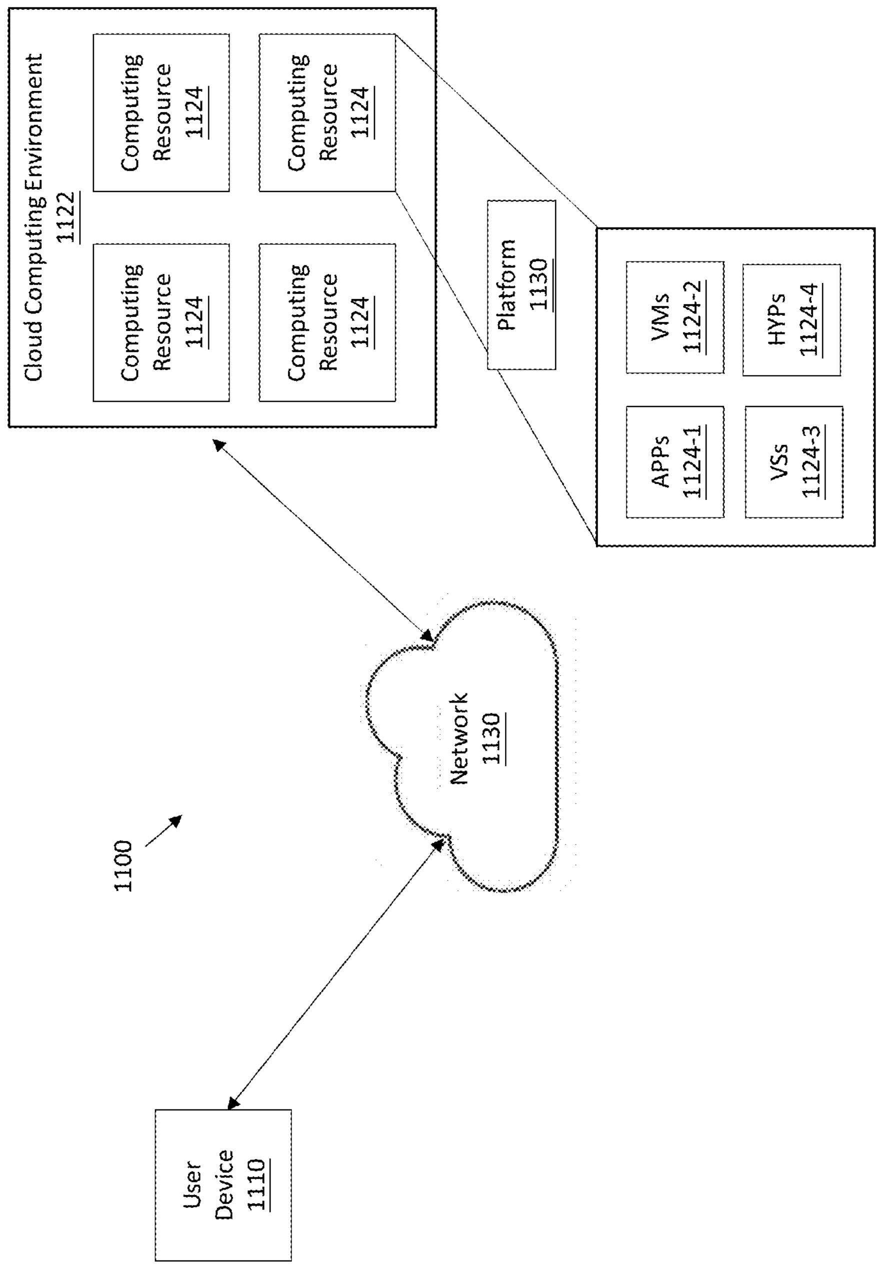
FIG. 11 is a diagram of an example environment in which systems and/or methods, described herein, may be implemented.

FIG. 11 is a diagram of an example environment 1100 in which systems and/or methods, described herein, may be implemented. As shown in FIG. 11, environment 1100 may include a user device 1110, a platform 1120, and a network 1130. Devices of environment 1100 may interconnect via wired connections, wireless connections, or a combination of wired and wireless connections. In embodiments, any of the functions and operations described with reference to FIG. 1 above may be performed by any combination of elements illustrated in FIG. 11.

User device 1110 includes one or more devices capable of receiving, generating, storing, processing, and/or providing information associated with platform 1120. For example, user device 1110 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 1110 may receive information from and/or transmit information to platform 1120.

Platform 1120 includes one or more devices capable of receiving, generating, storing, processing, and/or providing information. In some implementations, platform 1120 may include a cloud server or a group of cloud servers. In some implementations, platform 1120 may be designed to be modular such that certain software components may be swapped in or out depending on a particular need. As such, platform 1120 may be easily and/or quickly reconfigured for different uses.

In some implementations, as shown, platform 1120 may be hosted in cloud computing environment 1122. Notably, while implementations described herein describe platform 1120 as being hosted in cloud computing environment 1122, in some implementations, platform 1120 may not be cloud-based (i.e., may be implemented outside of a cloud computing environment) or may be partially cloud-based.

Cloud computing environment 1122 includes an environment that hosts platform 1120. Cloud computing environment 1122 may provide computation, software, data access, storage, etc., services that do not require end-user (e.g., user device 1110) knowledge of a physical location and configuration of system(s) and/or device(s) that hosts platform 1120. As shown, cloud computing environment 1122 may include a group of computing resources 1124 (referred to collectively as "computing resources 1124" and individually as "computing resource 1124").

Computing resource 1124 includes one or more personal computers, a cluster of computing devices, workstation computers, server devices, or other types of computation and/or communication devices. In some implementations, computing resource 1124 may host platform 1120. The cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, or the like.

Application 1124-1 includes one or more software applications that may be provided to or accessed by user device 1110. Application 1124-1 may eliminate a need to install and execute the software applications on user device 1110. For example, application 1124-1 may include software associated with platform 1120 and/or any other software capable of being provided via cloud computing environment 1122. In some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS"). A process virtual machine may execute a single program, and may support a single process. In some implementations, virtual machine 1124-2 may execute on behalf of a user (e.g., user device 1110), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

Figure 12:
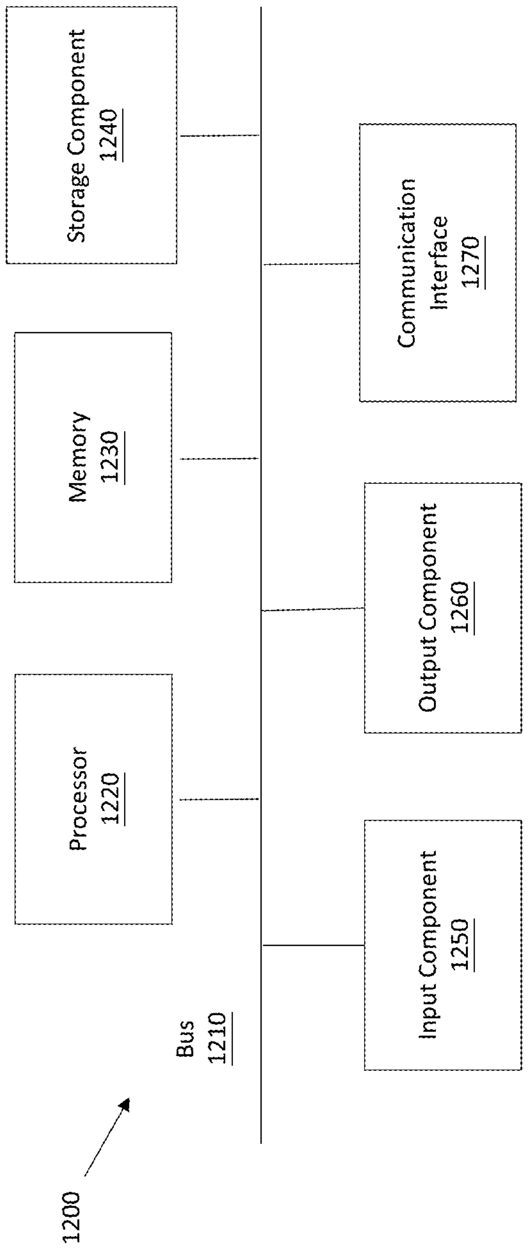
FIG. 12 is a diagram of example components of a device according to an embodiment.

FIG. 12 is a diagram of example components of a device 1200. Device 1200 may correspond to user device 1110 and/or platform 1120. As shown in FIG. 12, device 1200 may include a bus 1210, a processor 1220, a memory 1230, a storage component 1240, an input component 1250, an output component 1260, and a communication interface 1270.

Bus 1210 includes a component that permits communication among the components of device 1200. Processor 1220 may be implemented in hardware, firmware, or a combination of hardware and software. Processor 1220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1220 includes one or more processors capable of being programmed to perform a function. Memory 1230 includes a random-access memory (RAM), a read only memory (ROM), and/or another type of dynamic or static storage device (e.g., a flash memory, a magnetic memory, and/or an optical memory) that stores information and/or instructions for use by processor 1220.

Storage component 1240 stores information and/or software related to the operation and use of device 1200. For example, storage component 1240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 1250 includes a component that permits device 1200 to receive information, such as via user input (e.g., a touch screen display, a keyboard, a keypad, a mouse, a button, a switch, and/or a microphone). Additionally, or alternatively, input component 1250 may include a sensor for sensing information (e.g., a global positioning system (GPS) component, an accelerometer, a gyroscope, and/or an actuator). Output component 1260 includes a component that provides output information from device 1200 (e.g., a display, a speaker, and/or one or more light-emitting diodes (LEDs)).

Communication interface 1270 includes a transceiver-like component (e.g., a transceiver and/or a separate receiver and transmitter) that enables device 1200 to communicate with other devices, such as via a wired connection, a wireless connection, or a combination of wired and wireless connections. Communication interface 1270 may permit device 1200 to receive information from another device and/or provide information to another device. For example, communication interface 1270 may include an Ethernet interface, an optical interface, a coaxial interface, an infrared interface, a radio frequency (RF) interface, a universal serial bus (USB) interface, a Wi-Fi interface, a cellular network interface, or the like.

Device 1200 may perform one or more processes described herein. Device 1200 may perform these processes in response to processor 1220 executing software instructions stored by a non-transitory computer-readable medium, such as memory 1230 and/or storage component 1240. A computer-readable medium is defined herein as a non-transitory memory device. A memory device includes memory space within a single physical storage device or memory space spread across multiple physical storage devices.

Software instructions may be read into memory 1230 and/or storage component 1240 from another computer-readable medium or from another device via communication interface 1270. When executed, software instructions stored in memory 1230 and/or storage component 1240 may cause processor 1220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 12 are provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

In embodiments, any one of the operations or processes of FIGS. 1 to 11 may be implemented by or using any one of the elements illustrated in FIGS. 11 and 12. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1] A system for implementing geolocation-based key performance indicator (KPI) visualization in a polygon-defined geolocation area of a telecommunications network, the system includes: a memory storing instructions; and at least one processor configured to execute the instructions to: based on the polygon-defined geolocation area, receive data defining the boundaries of the polygon-defined geolocation area; based on the received data, generate pixel coordinates of a polygon circumscribing the boundaries of the polygon-defined geolocation area from a pixel map; determine, for each generated pixel coordinate of the polygon, one or more pixel tiles that insect with the generated pixel coordinate of the polygon from the pixel map, wherein a pixel tile represents an array of pixels from the pixel map; determine, for each pixel tile among the pixel tiles that intersect with the generated pixel coordinate of the polygon, one or more pixels that intersect with the polygon, and for each pixel among the one or more pixels that intersect with the polygon, determine a color of the pixel, and determine, based on the color, a KPI value for at least one KPI from a lookup table; output, for each pixel among the one or more pixels that intersect with the polygon, the at least one KPI value for each of the at least one KPI.

Item [2] The system according to item [1], wherein while outputting the at least one KPI value of the polygon-defined geolocation area, the at least one processor may be further configured to execute the instructions to: for each of the at least one KPI, generate coverage information of the polygon-defined geolocation area, wherein while generating, the at least one processor may be further configured to execute the instructions to: determine the total number of pixels among the one or more pixels that intersect with the polygon; sum, for each pixel among the one or more pixels that intersect with the polygon, the KPI value for the KPI of each pixel, and divide the sum of the KPI values of all pixels among the one or more pixels that intersect with the polygon by the total number of pixels; output, for each of the at least one KPI, the coverage information of the polygon-defined geolocation area, wherein the coverage information represents the areal average of the one KPI within the boundaries of the polygon-defined geolocation area.

Item [3] The system according to item [1], wherein while receiving the data defining the boundaries of the polygon-defined geolocation area, the at least one processor may be further configured to execute the instructions to: receive a data file includes geolocation data of the at least one polygon-defined geolocation area defining the boundaries of the at least one polygon-defined geolocation area; for each polygon-defined geolocation area, based on the received data, generate pixel coordinates of a polygon circumscribing the boundaries of the polygon-defined geolocation area from the pixel map.

Item [4] The system according to item [1], wherein while receiving the data defining the boundaries of the polygon-defined geolocation area, the at least one processor may be further configured to execute the instructions to: receive data defining the boundaries of the polygon-defined geolocation area from a graphical user interface (GUI); based on the received data, generate pixel coordinates of a polygon circumscribing the boundaries of the GUI-defined geolocation area from a pixel map.

Item [5] The system according to item [1], wherein while receiving the data defining the boundaries of the polygon-defined geolocation area, the at least one processor may be further configured to execute the instructions to: receive data defining the boundaries of the polygon-defined geolocation by a viewport area; generate pixel coordinates of a polygon circumscribing the boundaries of the viewport area from the pixel map.

Item [6] The system according to item [1], wherein while outputting the at least one KPI value for each of the at least one KPI, the at least one processor may be further configured to execute the instructions to: for each polygon, receive, via a graphical user interface, at least one polygon identification data; based on the received at least one polygon identification data, store polygon data in a geography service database, wherein the polygon data may include polygon coordinates of the polygon-defined geolocation area.

Item [7] The system according to item [6], wherein while receiving data defining the boundaries of the polygon-defined geolocation area, the at least one processor may be further configured to execute the instructions to: receive, via a graphical user interface, the at least one polygon identification data for a polygon stored in the geography service database; request the polygon data from the geography service database; generate the pixel coordinates from the polygon coordinates of the geography service database.

Item [8] A method for implementing geolocation-based key performance indicator (KPI) visualization in a polygon-defined geolocation area of a telecommunications network, the method includes: based on the polygon-defined geolocation area, receiving data defining the boundaries of the polygon-defined geolocation area; based on the received data, generating pixel coordinates of a polygon circumscribing the boundaries of the polygon-defined geolocation area from a pixel map; determining, for each generated pixel coordinate of the polygon, one or more pixel tiles that insect with the generated pixel coordinate of the polygon from the pixel map, wherein a pixel tile represents an array of pixels from the pixel map; determining, for each pixel tile among the pixel tiles that intersect with the generated pixel coordinate of the polygon, one or more pixels that intersect with the polygon, and for each pixel among the one or more pixels that intersect with the polygon, determining a color of the pixel, and determining, based on the color, a KPI value for at least one KPI from a lookup table; outputting, for each pixel among the one or more pixels that intersect with the polygon, the at least one KPI value for each of the at least one KPI.

Item [9] The method according to item [8], wherein the outputting of the at least one KPI value of the polygon-defined geolocation area may include: for each of the at least one KPI, generating coverage information of the polygon-defined geolocation area, wherein while generating: determining the total number of pixels among the one or more pixels that intersect with the polygon; summing, for each pixel among the one or more pixels that intersect with the polygon, the KPI value for the KPI of each pixel, and dividing the sum of the KPI values of all pixels among the one or more pixels that intersect with the polygon by the total number of pixels; outputting, for each of the at least one KPI, the coverage information of the polygon-defined geolocation area, wherein the coverage information represents an areal average of the one KPI within the boundaries of the polygon-defined geolocation area.

Item [10] The method according to item [8], wherein the receiving of the data defining the boundaries of the polygon-defined geolocation area may include: receiving a data file includes geolocation data of the at least one polygon-defined geolocation area defining the boundaries of the at least one polygon-defined geolocation area; for each polygon-defined geolocation area, based on the received data, generating pixel coordinates of a polygon circumscribing the boundaries of the polygon-defined geolocation area from the pixel map.

Item [11] The method according to item [8], wherein the receiving of the data defining the boundaries of the polygon-defined geolocation area may include: receiving data defining the boundaries of the polygon-defined geolocation area from a graphical user interface (GUI); based on the received data, generate pixel coordinates of a polygon circumscribing the boundaries of the GUI-defined geolocation area from the pixel map.

Item [12] The method according to item [8], wherein the receiving of the data defining the boundaries of the polygon-defined geolocation area may include: receiving data defining the boundaries of the polygon-defined geolocation by a viewport area; generating pixel coordinates of a polygon circumscribing the boundaries of the viewport area from the pixel map.

Item [13] The method according to item [8], wherein the outputting of the at least one KPI value for each of the at least one KPI may include: for each polygon, receiving, via a graphical user interface, at least one polygon identification data; based on the received at least one polygon identification data, storing polygon data to a geography service database, wherein the polygon data may include polygon coordinates of the polygon-defined geolocation area.

Item [14] The method according to item [13], wherein the receiving of data defining the boundaries of the polygon-defined geolocation area may include: receiving, via a graphical user interface, the at least one polygon identification data for a polygon stored in the geography service database; requesting the polygon data from the geography service database; generating the pixel coordinates from the polygon coordinates of the geography service database.

Item [15] A non-transitory computer-readable recording medium having recorded thereon instructions executable by at least one processor configured to perform a method for implementing geolocation-based key performance indicator (KPI) visualization in a polygon-defined geolocation area of a telecommunications network, the method includes: based on the polygon-defined geolocation area, receiving data defining the boundaries of the polygon-defined geolocation area; based on the received data, generating pixel coordinates of a polygon circumscribing the boundaries of the polygon-defined geolocation area from a pixel map; determining, for each generated pixel coordinate of the polygon, one or more pixel tiles that insect with the generated pixel coordinate of the polygon from the pixel map, wherein a pixel tile represents an array of pixels from the pixel map; determining, for each pixel tile among the pixel tiles that intersect with the generated pixel coordinate of the polygon, one or more pixels that intersect with the polygon, and for each pixel among the one or more pixels that intersect with the polygon, determining a color of the pixel, and determining, based on the color, a KPI value for at least one KPI from a lookup table; outputting, for each pixel among the one or more pixels that intersect with the polygon, the at least one KPI value for each of the at least one KPI.

Item [16] The non-transitory computer-readable recording medium according to item [15], wherein the outputting of the at least one KPI value of the polygon-defined geolocation area may include: for each of the at least one KPI, generating coverage information of the polygon-defined geolocation area, wherein while generating: determining the total number of pixels among the one or more pixels that intersect with the polygon; summing, for each pixel among the one or more pixels that intersect with the polygon, the KPI value for the KPI of each pixel, and dividing the sum of the KPI values of all pixels among the one or more pixels that intersect with the polygon by the total number of pixels; outputting, for each of the at least one KPI, the coverage information of the polygon-defined geolocation area, wherein the coverage information represents an areal average of the one KPI within the boundaries of the polygon-defined geolocation area.

Item [17] The non-transitory computer-readable recording medium according to item [15], wherein the receiving of the data defining the boundaries of the polygon-defined geolocation area may include: receiving a data file includes geolocation data of the at least one polygon-defined geolocation area defining the boundaries of the at least one polygon-defined geolocation area; for each polygon-defined geolocation area, based on the received data, generating pixel coordinates of a polygon circumscribing the boundaries of the polygon-defined geolocation area from the pixel map.

Item [18] The non-transitory computer-readable recording medium according to item [15], wherein the receiving of the data defining the boundaries of the polygon-defined geolocation area may include: receiving data defining the boundaries of the polygon-defined geolocation area from a graphical user interface (GUI); based on the received data, generate pixel coordinates of a polygon circumscribing the boundaries of the GUI-defined geolocation area from the pixel map.

Item [19] The non-transitory computer-readable recording medium according to item [15], wherein the receiving the data defining the boundaries of the polygon-defined geolocation area may include: receiving data defining the boundaries of the polygon-defined geolocation by a viewport area; generating pixel coordinates of a polygon circumscribing the boundaries of the viewport area from the pixel map.

Item [20] The non-transitory computer-readable recording medium according to item [15], wherein the outputting of the at least one KPI value for each of the at least one KPI may include: for each polygon, receiving, via a graphical user interface, at least one polygon identification data; based on the received at least one polygon identification data, storing polygon data to a geography service database, wherein the polygon data may include polygon coordinates of the polygon-defined geolocation area; and wherein the receiving data defining the boundaries of the polygon-defined geolocation area may include: receiving, via a graphical user interface, the at least one polygon identification data for a polygon stored in the geography service database; requesting the polygon data from the geography service database; generating the pixel coordinates from the polygon coordinates of the geography service database.

What is claimed is:

1. A system for implementing geolocation-based key performance indicator (KPI) visualization in a polygon-defined geolocation area of a telecommunications network, the system comprising:

a memory storing instructions; and at least one processor configured to execute the instructions to:

based on the polygon-defined geolocation area, receive data defining the boundaries of the polygon-defined geolocation area;

based on the received data, generate pixel coordinates of a polygon circumscribing the boundaries of the polygon-defined geolocation area from a pixel map;

determine, for each generated pixel coordinate of the polygon, one or more pixel tiles that intersect with the generated pixel coordinate of the polygon from the pixel map, wherein a pixel tile represents an array of pixels from the pixel map;

determine, for each pixel tile among the pixel tiles that intersect with the generated pixel coordinate of the polygon, one or more pixels that intersect with the polygon, and for each pixel among the one or more pixels that intersect with the polygon, determine a color of the pixel, and determine, based on the color, a KPI value for at least one KPI from a lookup table;

output, for each pixel among the one or more pixels that intersect with the polygon, the at least one KPI value for each of the at least one KPI; and, calculate, for the polygon-defined geolocation area and for each of the at least one KPI, a representative KPI value based on the output KPI value for each pixel determined from the color of each pixel.

2. The system as claimed in claim 1, wherein the at least one processor is further configured to execute the instructions to output the at least one KPI value by:

for each of the at least one KPI, generating coverage information of the polygon-defined geolocation area, wherein while generating, the at least one processor is further configured to execute the instructions to:

determine the total number of pixels among the one or more pixels that intersect with the polygon;

sum, for each pixel among the one or more pixels that intersect with the polygon, the KPI value for the KPI of each pixel, and divide the sum of the KPI values of all pixels among the one or more pixels that intersect with the polygon by the total number of pixels;

outputting, for each of the at least one KPI, the coverage information of the polygon-defined geolocation area, wherein the coverage information represents the areal average of the one KPI within the boundaries of the polygon-defined geolocation area.

3. The system as claimed in claim 1, wherein while receiving the data defining the boundaries of the polygon-defined geolocation area, the at least one processor is further configured to execute the instructions to:

receive a data file comprising geolocation data of the at least one polygon-defined geolocation area defining the boundaries of the at least one polygon-defined geolocation area;

for each polygon-defined geolocation area, based on the received data, generate pixel coordinates of a polygon circumscribing the boundaries of the polygon-defined geolocation area from the pixel map.

4. The system as claimed in claim 1, wherein while receiving the data defining the boundaries of the polygon-defined geolocation area, the at least one processor is further configured to execute the instructions to:

receive data defining the boundaries of the polygon-defined geolocation area from a graphical user interface (GUI);

based on the received data, generate pixel coordinates of a polygon circumscribing the boundaries of the GUI-defined geolocation area from a pixel map.

5. The system as claimed in claim 1, wherein while receiving the data defining the boundaries of the polygon-defined geolocation area, the at least one processor is further configured to execute the instructions to:

receive data defining the boundaries of the polygon-defined geolocation by a viewport area;

generate pixel coordinates of a polygon circumscribing the boundaries of the viewport area from the pixel map.

6. The system as claimed in claim 1, wherein while outputting the at least one KPI value for each of the at least one KPI, the at least one processor is further configured to execute the instructions to:

for each polygon, receive, via a graphical user interface, at least one polygon identification data;

based on the received at least one polygon identification data, store polygon data in a geography service database, wherein the polygon data comprises polygon coordinates of the polygon-defined geolocation area.

7. The system as claimed in claim 6, wherein while receiving data defining the boundaries of the polygon-defined geolocation area, the at least one processor is further configured to execute the instructions to:

receive, via a graphical user interface, the at least one polygon identification data for a polygon stored in the geography service database;

request the polygon data from the geography service database;

generate the pixel coordinates from the polygon coordinates of the geography service database.

8. The system as claimed in claim 1, wherein the at least one processor is further configured to calculate the representative value by calculating, for the polygon-defined geolocation area and for each of the at least one KPI, an average KPI value based on the output KPI value for each pixel determined from the color of each pixel.

9. A method for implementing geolocation-based key performance indicator (KPI) visualization in a polygon-defined geolocation area of a telecommunications network, the method comprising:

based on the polygon-defined geolocation area, receiving data defining the boundaries of the polygon-defined geolocation area;

based on the received data, generating pixel coordinates of a polygon circumscribing the boundaries of the polygon-defined geolocation area from a pixel map;

determining, for each generated pixel coordinate of the polygon, one or more pixel tiles that intersect with the generated pixel coordinate of the polygon from the pixel map, wherein a pixel tile represents an array of pixels from the pixel map;

determining, by at least one computer processor for each pixel tile among the pixel tiles that intersect with the generated pixel coordinate of the polygon, one or more pixels that intersect with the polygon, and for each pixel among the one or more pixels that intersect with the polygon, determining a color of the pixel, and determining, based on the color, a KPI value for at least one KPI from a lookup table;

outputting, for each pixel among the one or more pixels that intersect with the polygon, the at least one KPI value for each of the at least one KPI; and calculating, for the polygon-defined geolocation area and for each of the at least one KPI, a representative KPI value based on the output KPI value for each pixel determined from the color of each pixel.

10. The method as claimed in claim 9, wherein the outputting of the at least one KPI value of the polygon-defined geolocation area comprises:

for each of the at least one KPI, generating coverage information of the polygon-defined geolocation area, wherein while generating:

determining the total number of pixels among the one or more pixels that intersect with the polygon;

summing, for each pixel among the one or more pixels that intersect with the polygon, the KPI value for the KPI of each pixel, and dividing the sum of the KPI values of all pixels among the one or more pixels that intersect with the polygon by the total number of pixels;

outputting, for each of the at least one KPI, the coverage information of the polygon-defined geolocation area, wherein the coverage information represents an areal average of the one KPI within the boundaries of the polygon-defined geolocation area.

11. The method as claimed in claim 9, wherein the receiving of the data defining the boundaries of the polygon-defined geolocation area comprises:

receiving a data file comprising geolocation data of the at least one polygon-defined geolocation area defining the boundaries of the at least one polygon-defined geolocation area;

for each polygon-defined geolocation area, based on the received data, generating pixel coordinates of a polygon circumscribing the boundaries of the polygon-defined geolocation area from the pixel map.

12. The method as claimed in claim 9, wherein the receiving of the data defining the boundaries of the polygon-defined geolocation area comprises:

receiving data defining the boundaries of the polygon-defined geolocation area from a graphical user interface (GUI);

based on the received data, generate pixel coordinates of a polygon circumscribing the boundaries of the GUI-defined geolocation area from the pixel map.

13. The method as claimed in claim 9, wherein the receiving of the data defining the boundaries of the polygon-defined geolocation area comprises:

receiving data defining the boundaries of the polygon-defined geolocation by a viewport area;

generating pixel coordinates of a polygon circumscribing the boundaries of the viewport area from the pixel map.

14. The method as claimed in claim 9, wherein the outputting of the at least one KPI value for each of the at least one KPI, comprises:

for each polygon, receiving, via a graphical user interface, at least one polygon identification data;

based on the received at least one polygon identification data, storing polygon data to a geography service database, wherein the polygon data comprises polygon coordinates of the polygon-defined geolocation area.

15. The method as claimed in claim 14, wherein the receiving of data defining the boundaries of the polygon-defined geolocation area comprises:

receiving, via a graphical user interface, the at least one polygon identification data for a polygon stored in the geography service database;

requesting the polygon data from the geography service database;

generating the pixel coordinates from the polygon coordinates of the geography service database.

16. A non-transitory computer-readable recording medium having recorded thereon instructions executable by at least one processor configured to perform a method for implementing geolocation-based key performance indicator (KPI) visualization in a polygon-defined geolocation area of a telecommunications network, the method comprising:

based on the polygon-defined geolocation area, receiving data defining the boundaries of the polygon-defined geolocation area;

based on the received data, generating pixel coordinates of a polygon circumscribing the boundaries of the polygon-defined geolocation area from a pixel map;

determining, for each generated pixel coordinate of the polygon, one or more pixel tiles that intersect with the generated pixel coordinate of the polygon from the pixel map, wherein a pixel tile represents an array of pixels from the pixel map;

determining, for each pixel tile among the pixel tiles that intersect with the generated pixel coordinate of the polygon, one or more pixels that intersect with the polygon, and for each pixel among the one or more pixels that intersect with the polygon, determining a color of the pixel, and determining, based on the color, a KPI value for at least one KPI from a lookup table;

outputting, for each pixel among the one or more pixels that intersect with the polygon, the at least one KPI value for each of the at least one KPI; and calculating, for the polygon-defined geolocation area and for each of the at least one KPI, a representative KPI value based on the output KPI value for each pixel determined from the color of each pixel.

17. The non-transitory computer-readable recording medium as claimed in claim 16, wherein the outputting of the at least one KPI value of the polygon-defined geolocation area comprises:

for each of the at least one KPI, generating coverage information of the polygon-defined geolocation area, wherein while generating:

determining the total number of pixels among the one or more pixels that intersect with the polygon;

summing, for each pixel among the one or more pixels that intersect with the polygon, the KPI value for the KPI of each pixel, and dividing the sum of the KPI values of all pixels among the one or more pixels that intersect with the polygon by the total number of pixels;

outputting, for each of the at least one KPI, the coverage information of the polygon-defined geolocation area, wherein the coverage information represents an areal average of the one KPI within the boundaries of the polygon-defined geolocation area.

18. The non-transitory computer-readable recording medium in claim 16, wherein the receiving of the data defining the boundaries of the polygon-defined geolocation area comprises:

receiving a data file comprising geolocation data of the at least one polygon-defined geolocation area defining the boundaries of the at least one polygon-defined geolocation area;

for each polygon-defined geolocation area, based on the received data, generating pixel coordinates of a polygon circumscribing the boundaries of the polygon-defined geolocation area from the pixel map.

19. The non-transitory computer-readable recording medium as claimed in claim 16, wherein the receiving of the data defining the boundaries of the polygon-defined geolocation area comprises:

receiving data defining the boundaries of the polygon-defined geolocation area from a graphical user interface (GUI);

based on the received data, generate pixel coordinates of a polygon circumscribing the boundaries of the GUI-defined geolocation area from the pixel map.

20. The non-transitory computer-readable recording medium as claimed in claim 16, wherein the receiving of the data defining the boundaries of the polygon-defined geolocation area comprises:

receiving data defining the boundaries of the polygon-defined geolocation by a viewport area;

generating pixel coordinates of a polygon circumscribing the boundaries of the viewport area from the pixel map.

21. The non-transitory computer-readable recording medium as claimed in claim 16, wherein the outputting of the at least one KPI value for each of the at least one KPI, comprises:

for each polygon, receiving, via a graphical user interface, at least one polygon identification data;

based on the received at least one polygon identification data, storing polygon data to a geography service database, wherein the polygon data comprises polygon coordinates of the polygon-defined geolocation area; and wherein the receiving data defining the boundaries of the polygon-defined geolocation area comprises:

receiving, via a graphical user interface, the at least one polygon identification data for a polygon stored in the geography service database;

requesting the polygon data from the geography service database;

generating the pixel coordinates from the polygon coordinates of the geography service database.

* * * * *